Figure 1:
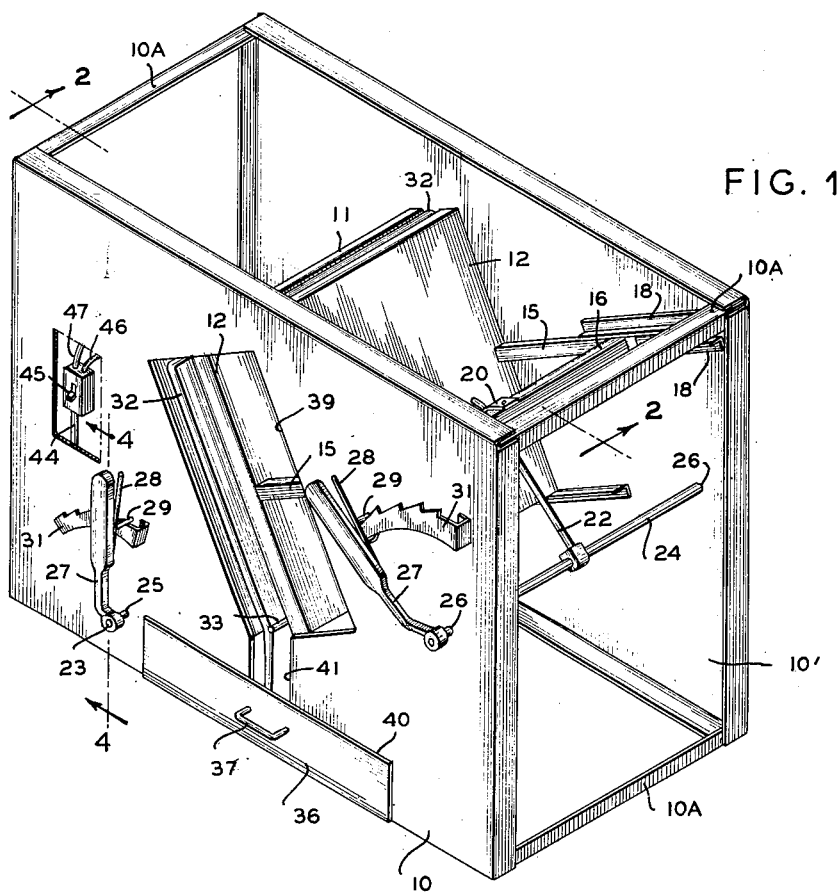

April 30, 1963 C. J. ALBRIGHT 3,087,418
BROILER

Filed May 29, 1957 3 Sheets-Sheet 1

INVENTOR
C. J. ALBRIGHT
BY A. Yates Dowell I & II
ATTORNEYS

April 30, 1963 C. J. ALBRIGHT 3,087,418
BROILER
Filed May 29, 1957 3 Sheets-Sheet 2
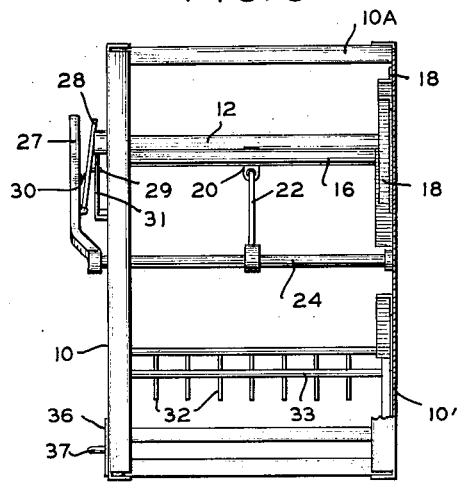
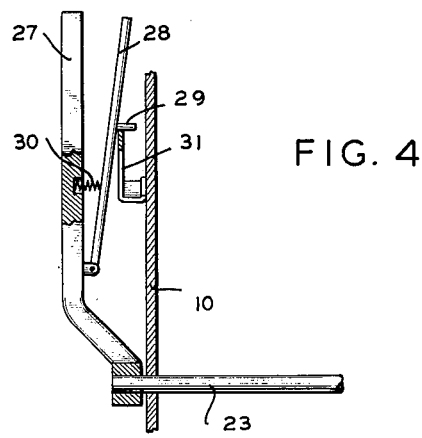
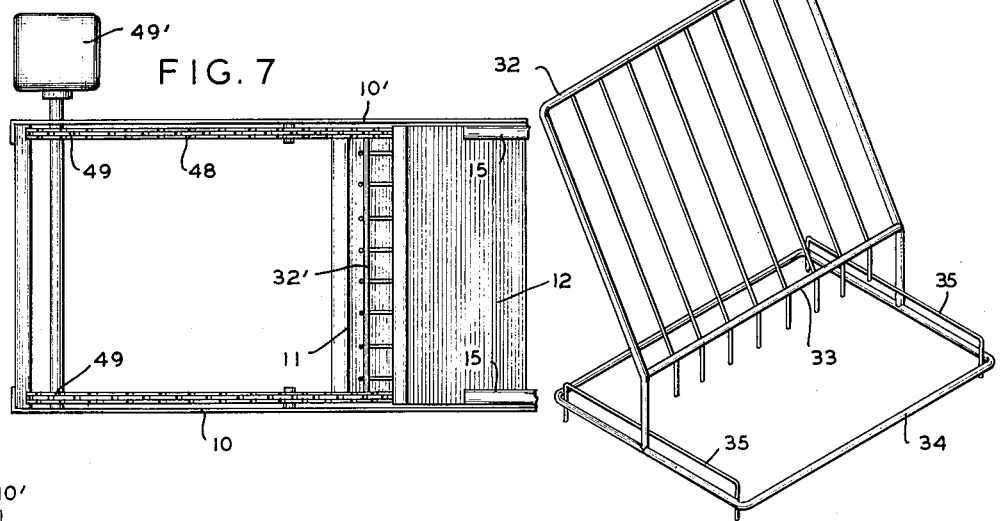
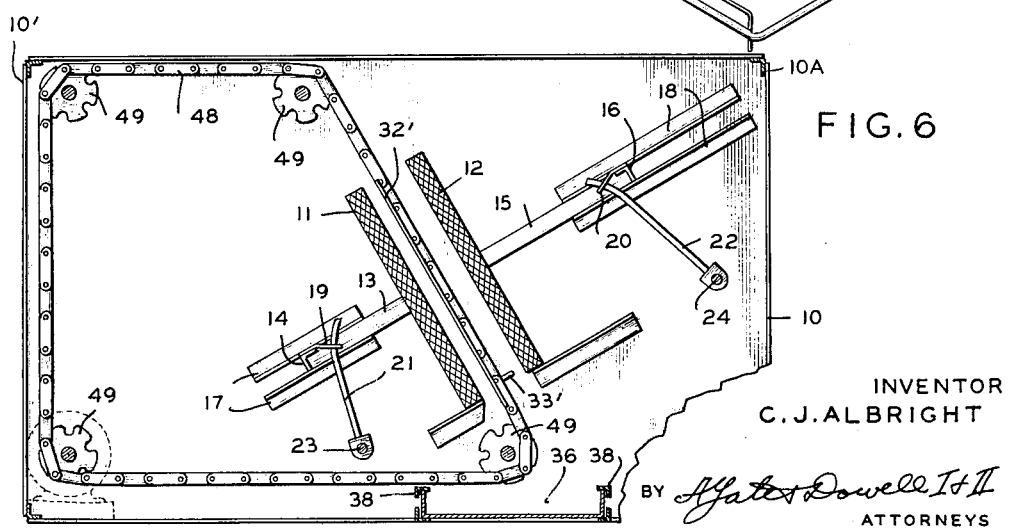
INVENTOR
C. J. ALBRIGHT April 30, 1963    C. J. ALBRIGHT    3,087,418
BROILER Filed May 29, 1957    3 Sheets-Sheet 3

INVENTOR
C. J. ALBRIGHT

BY
ATTORNEYS

United States Patent Office 3,087,418
Patented Apr. 30, 1963

3,087,418
BROILER
Charles J. Albright, 1132 Holly Court, Oak Park, Ill.
Filed May 29, 1957, Ser. No. 662,485
18 Claims. (Cl. 99—386)

This invention relates to the preparation of foods of various kinds preparatory to their consumption including the cooking of such foods to change them from their raw, tough, and sometimes unpalatable state to cooked, tender, digestible, and palatable condition.

The invention relates more particularly to the cooking of meats such as steaks, or other substance for human consumption and especially by broiling or the subjection of the steak to direct heat from charcoal, gas, electricity, or other source.

The broiling of steaks, chops, and other foods has been done in various ways including in fireplaces where the meat was suspended, in stoves where the meat was supported in a manner to permit it to be subjected to the direct heat of the flame, or coals, charcoal being a very common fuel and the meat being supported in proximity thereto, depending upon the nature and extent of the cooking desired.

It also has been common to provide side-by-side spaced heating elements between which the materials to be cooked might be inserted. Stoves have been fitted with broiling apparatus, however, equipment heretofore employed has not been satisfactory.

Most broilers cook only on one side at a time, and when the support for the meat is upright it is necessary to clamp the same thereto. Because of the lack of adjustability of the heating elements or source of heat relative to the meat it is difficult if not impossible, to see the meat while it is cooking without removing it from the vicinity of the heat, so that it cannot be told when the desired cooking is complete. Also, prior devices are complicated, the insertion of meat being a problem, and the devices otherwise not being easy to use. Further, the drip pan remains in one position while the rack with the dripping meat is removed so that dripping of hot grease or the essence of the meat is frequent and the grease container is difficult to remove.

It is an object of the invention to overcome the above problems and to provide a broiler having heating elements adjustable relative to a rack on which meat is supported, such rack being slightly inclined to the vertical sufficient to cause a meat such as steak or chops to remain thereon by gravity. This rack is adapted to be inserted and subjected to heat on both sides so that it can be determined by sight when cooking is completed.

Another object of the invention is to provide a broiler with a meat holder on which meat can be readily and easily retained by gravity, which is easily inserted and removed, which carries a drip pan fixed beneath it and which grease pan can be easily detached and its contents drained.

Figure 2:
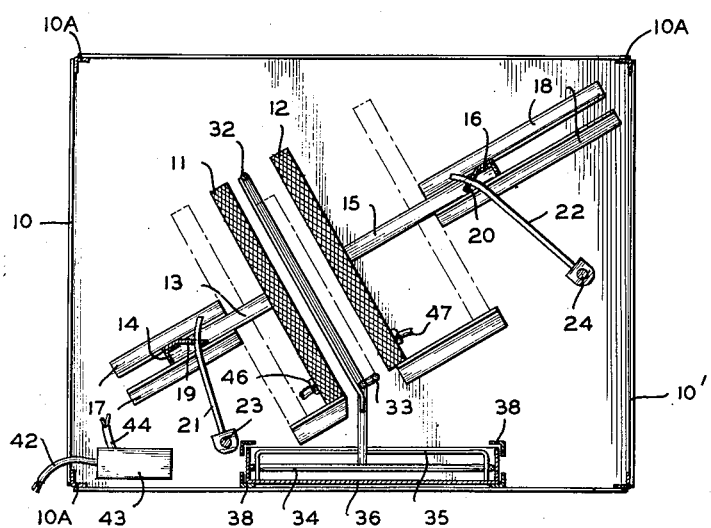
Figure 8:
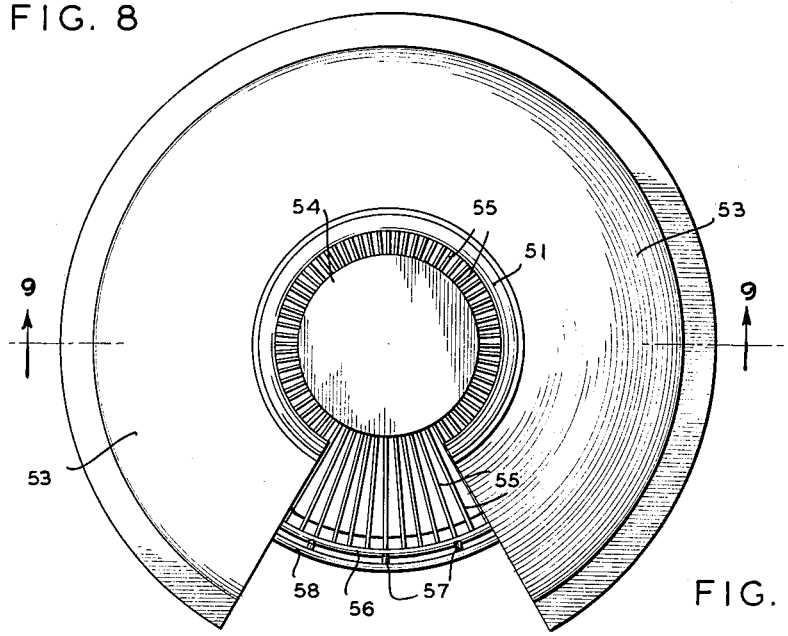
Figure 9:
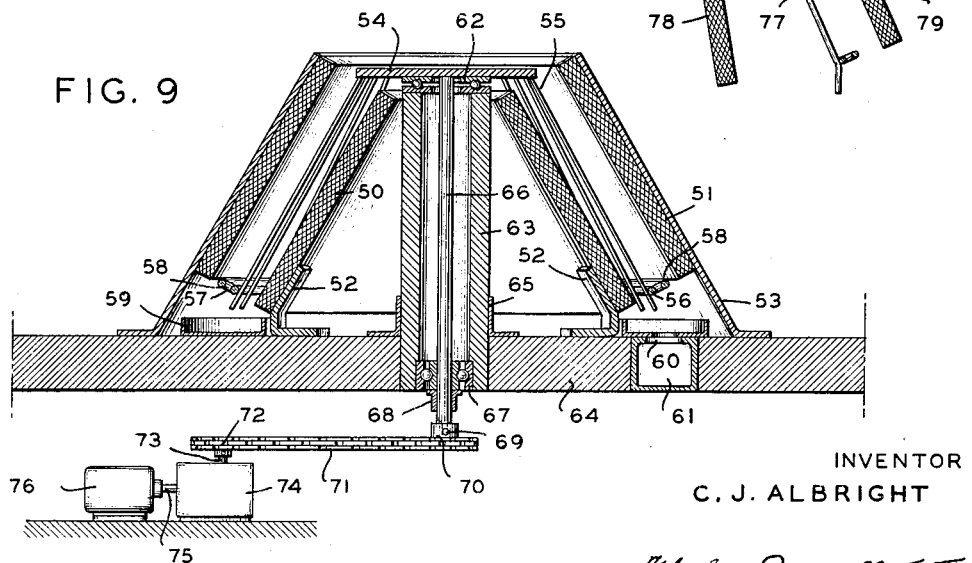

Further objects and advantages of the invention will be apparent from the following description taken in conjunction with the accompanying drawings, wherein:

FIG. 1 is a perspective illustrating one application of the invention;

FIG. 2, a vertical section on the line 2—2 of FIG. 1;

FIG. 3, an end elevation;

FIG. 4, a fragmentary detail section on the line 4—4 of FIG. 1;

FIG. 5, a perspective of the rack;

FIG. 6, a view similar to FIG. 2 of a modified form of rack;

FIG. 7, a top plan view of FIG. 6;

FIG. 8, a further modified form of a rack and heating elements;

FIG. 9, a section on the line 9—9 of FIG. 8, and

Figure 10:
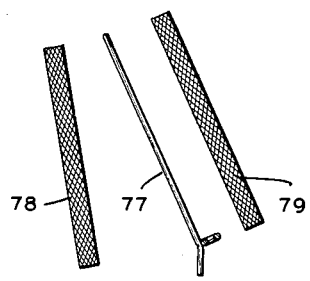

FIG. 10, a section of a slightly modified arrangement of heating elements and rack.

Briefly stated, the device of the present invention is intended for cooking by the application of heat to the exterior for broiling including particularly steaks, chops, and other foods. The structure comprises a generally rectangular housing or casing in which are located spaced parallel heating elements, electrical or otherwise, and between which a rack is adapted to be disposed to support steaks or other substances to be broiled or cooked, such rack being supported upon a base removably received in a drip pan slidable between slideway-forming channels into and from the housing through suitable openings therein. The rack has a bar along its lower portion forming a support for steaks and the like.

With continued reference to the drawings the device of the present invention includes a generally rectangular housing formed of side plates 10 and 10' connected by cross members 10A, the bottom edges of the sides and the bottom cross members 10A forming a base. In the housing are mounted substantially parallel heating elements 11 and 12, of any desired construction such as resistance coils of conventional character applied on one side of a silica quartz plate and preferably with heat reflective or resistant substance on the opposite side. The heating elements are inclined to the bottom or base of the housing and in actual use are therefore inclined to the horizontal.

The heating element 11 is supported by a pair of arms 13 one at each side of the plate, said arms being connected by a cross-bar 14. In like manner the heating element 12 is supported by arms 15 connected by cross-bar 16. The arms 13 at the opposite sides of the heaters 11 are moveable in slideways formed by the spaced angle members 17 and in like manner the arms 15 are moveable in slideways formed by the spaced angle members 18.

The steak or other material to be cooked or boiled is adapted to be disposed in inclined position between the heating elements 12 and 13 and the latter are adapted to be adjusted to the desired distance from the steaks to obtain the desired cooking to suit the individual taste.

In order to provide for such adjustment of the heating elements the cross-bars 14 and 16 have lugs 19 and 20 fixed thereto with apertures in the lugs 19 and 20 of sufficient size to loosely and slidably receive arms 21 and 22 respectively. In the apertures of which are disposed operating arms 21 and 22 carried by transverse shafts 23 and 24 journalled in openings in opposite sides of the housing the shaft 23 being journalled in openings 25 and the shaft 24 in opening 26 so that when the shafts 23 and 24 are partially rotated about their axes they will cause endwise movement of the arms 13 and 15 and lateral movement of the heating elements carried thereby.

The shafts 23 and 24 extend to the exterior of the housing and each shaft is provided with an operating arm 27 having a pivoted latch 28 with a latch finger 29, the latch being urged towards latching position my means of a spring 30. The latch finger 29 is adapted to engage a notched bar 31 mounted on the exterior of the housing 10, thus securing the arm 27 in fixed adusted position and thereby maintaining the heating elements 11 and 12 in adjusted positions.

A rack 32 inclined slightly from bottom to top and having a transverse member 33 is provided for holding a steak or other object in inclined position thereon solely by gravity, the transverse bar 33 preventing an object on the rack from sliding downwardly. The rack 32 is carried by a rectangular bottom frame 34 and a pair of inverted U-shaped members 35 which form legs which fit into a drip pan 36 extending across the housing and underlying the lower ends of the heating elements 11 and 12. The drip pan 36 has a handle 37 and the pan is slidable between a series of slide forming angles 38 extending across the housing. The rack 32 is formed of a heavy metal frame which supports upwardly inclined stiff wire-like bars 32A which are secured to the upper cross member of the heavy metal frame and to the bottom transverse bar 33 thereby forming a grid for supporting a steak or the like with the wires 32A serving as juice guiding elements causing the grease and the liquid exuding from the steak to follow the inclined path into the drip pan 36, thereby preventing the juices from dropping onto the heating element 11 with resulting savings in time required for cleaning the broiler.

The rack 32 is therefore carried in the drip pan and in order that access may be had to the interior of the housing a substantially rectangular slightly inclined opening 39 is provided in side 10 for the insertion and removal of rack 32. A similar opening 40 is provided for the drip pan and a connecting opening 41 is provided between the rack and the pan openings 39 and 40. Electricity is supplied through a conductor 42 from a source of supply to a junction box 43, from said junction box through a conduit through conductors 44, to a switch 45, and from such switch through conductors 46 and 47 to the heating elements 11 and 12.

Thus the rack is mounted in the pan and the steak or other material to be subjected to heat is placed on the rack thereupon the rack being slid into the housing and the proper proximity adjustment made of the heating elements.

Instead of a rack and drip pan the material subjected to heat may be supported on an endless conveyor such as a chain 48 extending around sprockets 49.

Instead of the rack being supported by a drip pan it may be mounted upon one or more endless chains 48 on sprockets 49, one of said sprockets preferably being driven by reversible motor 49' from outside the housing in which case the upright wires of the rack 32' drain exuded juices into the drip pan 36 previously described and a bottom ledge or cross-bar 33' prevents anything on the rack from sliding off. The rack 32' supported on chains 48, 48 is attached to the chains by a transverse bar at the upper or lower end of the rack and the rack can move to a position above the heating elements without interference because the housing is open at the top. The rack 32' is moved from loading position at the top of the broiler to the broiling position between the heating elements by the operation of the motor 49 in the selected direction.

Instead of the structure described, the device may be made in other forms such as a pair of frusto-conical heating elements 50 and 51 mounted concentrically by means of brackets 52 and a substantially frusto-conical support 53.

Between the frusto-conical heating elements is disposed a frusto-conical rack of wire or the like. This rack includes a mounting plate or disc 54 to which the upper ends of outwardly and downwardly extending wires are joined and with their lower ends connected by an annulus or ring 56 on which are connected outwardly extending arms 57 forming a rest or support 58 adapted to prevent material on the rack from sliding from the bottom of the same.

The inclined wires 55 direct the exuded juices downwardly into an annular trough or drip pan 59 having an opening 60 providing communication with a grease collector 61. The disc 54, from which the rack is supported is mounted upon a thrust bearing 62 on a post 63 attached to a table top or other support 64 by means of a sleeve bracket 65, thus the disc 54 which carries the rack is free to rotate on top of the post 63. In order to produce rotation of the rack the disc 54 has attached to it a shaft 66 maintained concentrically of the lower end of the post by means of a bearing 67 held at the proper height on the shaft by means of a collar 68. Attached to the lower end of a shaft by means of a pin 69 is a sprocket 70 driven by pin 71 driven by a sprocket 72 on a shaft 73 from a gear reduction unit 74 actuated through a shaft 75 from a motor 76. When the motor is energized the rack will be rotated although due to its construction little rotation is necessary during the cooking process.

Instead of the heating elements and rack being substantially parallel as illustrated in the several figures the lower heating element may be more nearly vertical as illustrated in FIG. 10. In this figure a rack 77 is disposed between heating elements 78 and 79 with the lower rack 78 more nearly vertical so that no part of it is beneath the rack to receive anything dropping therefrom.

It will be obvious to those skilled in the art that various changes may be made in the invention without departing from the spirit and scope thereof and therefore the invention is not limited by that which is illustrated in the drawings and described in the specification, but only as indicated in the accompanying claims.

What is claimed is:

1. A broiler for simultaneously broiling both surfaces of an article of food comprising a housing having a base for supporting said broiler in operative position of use, a pair of heating elements mounted in said housing in spaced generally parallel relation inclined to the horizontal when the housing is supported by said base in operative position of use, the spacing of the heating elements providing a food receiving cooking space, a food supporting rack having an inclined food supporting portion adapted to be received in said food receiving and cooking space for supporting an article of food thereon by gravity so the juices exuding from the food will follow the inclination of said food downwardly, means to retain the article of food against sliding downwardly on said rack, said rack being mounted on said housing for relative movement with respect to said heating elements so the food supporting portion of the rack with the food thereon may be inserted into and removed from the space between said heating elements, and means to adjust the relative spacing of the heating elements to the food supporting rack.

2. A broiler for simultaneously broiling both surfaces of an article of food comprising a housing having a base for supporting said broiler in operative position of use, a pair of heating elements mounted in said housing in spaced generally parallel relation inclined to the horizontal when the housing is supported by said base in operative position of use, the spacing of the heating elements providing a food receiving cooking space, a food supporting rack having an inclined food supporting portion adapted to be received in said food receiving and cooking space for supporting an article of food thereon by gravity so the juices exuding from the food will follow the inclination of said food downwardly, means to retain the article of food against sliding downwardly on said rack, said rack being mounted on said housing for relative movement with respect to said heating elements so the food supporting portion of the rack with the food thereon may be inserted into and removed from the space between said heating elements, means to adjust the spacing of the heating elements relative to the rack, and means to collect the exuded juices adjacent the bottom of the food supporting portion of the rack.

3. A broiler for simultaneously broiling both surfaces of an article of food comprising a housing having a base for supporting said broiler in operative position of use, a pair of heating elements mounted in said housing in spaced generally parallel relation inclined to the horizontal when the housing is supported by said base in operative position of use, the spacing of the heating elements providing a food receiving cooking space, a food supporting rack having an inclined food supporting portion adapted to be received in said food receiving and cooking space for supporting an article of food thereon by gravity so the juices exuding from the food will follow the inclination of said food downwardly, means to retain the article of food against sliding downwardly on said rack, said rack being mounted on said housing for relative movement with respect to said heating elements so the food supporting portion of the rack with the food thereon may be inserted into and removed from the space between said heating elements, said housing being provided with an opening of generally inverted T-shape adjacent a lateral edge of the space between the heating elements for the insertion and removal of the rack, a drip pan mounted for sliding movement through the horizontal portion of the T-shaped opening for supporting the rack and for collecting the exuded juices.

4. The invention according to claim 3 in which the rack includes a horizontally positioned bottom frame and the drip pan is of a size and does support the rack within the confines of the drip pan.

5. The method of broiling food to assure maximum retention of juices and optimum speed of broiling comprising supporting a food by gravity in a plane at an inclination to the horizontal on a rack, applying radiant heat by moving closely spaced heating elements toward both surfaces of the food simultaneously, the inclination of the food being maintained at an angle which is sufficiently steep to assure that juices exuded from the food will flow along the food to the bottom edge thereof, and continuing the heating until the food is broiled to the desired degree.

6. Apparatus for broiling comprising an enclosure adapted to be mounted horizontally to the ground, a food holder mounted at a non-vertical inclination to said enclosure, a pair of burners each having a radiating face with said faces being disposed toward each other, said inclined food holder extending between said pair of burners and with the front and rear portions confronting said radiating faces, said burners each being movably mounted toward and away from said food holder in a direction transverse to their radiating faces to adjust the intensity of the radiation upon said front and rear portions of the food holder by motion of each burner a selected space away, each of said pair of burners having means for movement during radiation including handle means remote from the radiating faces of the burners for manipulating the movement of each of said burners.

7. An apparatus according to claim 6 wherein the means for movement of each of said burners toward and away from the food holder includes means for individual and independent movement of each of the burners and pivoted handle means having portions extending exteriorly of said enclosure, whereby the pivotal movement of said handle means causes movement of each of the burners.

8. An apparatus according to claim 6 wherein the enclosure includes a base portion, the pair of burner faces and the sides of the food holder each are aligned substantially parallel to one another and inclined relative to the base, and the movement of said burners toward and away from said food holder being substantially normal to the faces of the burners.

9. An apparatus according to claim 6 wherein said inclined food holder is movably mounted in a direction transverse to the movement of each of said burners and outwardly therefrom, means mounted within said enclosure for guiding said movement, and said enclosure having an opening in alignment with the outward movement of the holder to provide access to the food holder for placement of food.

10. Apparatus for broiling comprising an enclosure adapted to be mounted horizontally to the ground, a food holder mounted at non-vertical inclination relative to said enclosure, a pair of burners each having a radiating face with said radiating faces being disposed toward each other, said food holder extending between said pair of burners and with the front and rear portions confronting said radiating faces, said food holder including an inclined surface for resting food thereon and a retaining ledge diverging outwardly and upwardly from said inclined surface and extending laterally of the angle of the inclined surface whereby food may lie inclined against the similarly inclined surface with lower portions of the food abutting the retaining edge and gravitational forces acting to maintain the food thereon each of said burners being movably mounted toward and away from said inclined food holder in a direction transverse to the radiating faces of the burner to adjust the intensity of the radiation upon said front and rear portions of the inclined food holder by motion of each burner a selected space away, each of said pair of burners having means for movement during radiation including handle means remote from the radiating faces of the burners for manipulating the movement of each of said burners.

11. A broiler for simultaneously broiling both surfaces of an article of food comprising a support, a pair of heating elements mounted on said support to be inclined to the horizontal, means to relatively move said heating elements substantially transversely to the inclination thereof, a drip pan positioned under the lower ends of said heating elements, a vertically extending standard mounted in said drip pan, an inclined rack extending from said vertically extending standard and lying in substantially parallel relation to said heating elements and in the space therebetween, said rack comprising essentially food supporting rods extending at the steepest inclination of said rack and terminating over said drip pan, the inclination of said rack and of said heating elements being such that the juices exuded from the food will follow the food and the rods of the rack to reduce the dropping of juices on said heating elements, and a laterally extending element mounted on said rack and extending transversely of the rack on the upper surface thereof for retaining the food article during the broiling process.

12. The method of broiling according to claim 5 in which the heating elements are moved toward and away from the adjacent surfaces of the food to obtain complete broiling of both surfaces thereof at the same time.

13. A broiler for simultaneously broiling food on both surfaces comprising a housing having an opening in a wall thereof, a drip pan mounted in said housing and movable from a position within the housing to a position outwardly thereof, a food supporting rack mounted above said drip pan to be movable therewith through said opening in said housing for the insertion and removal of food to be broiled, said food supporting rack comprising a plurality of inclined bars extending from adjacent the upper end of the rack to a position closely adjacent the drip pan, and an outwardly extending shelf-like member adjacent the lower end of the rack of engaging an edge of food to be supported on the rack, means to mount the drip pan and the rack for simultaneous movement into and out of the housing to provide for placing food and removing food from the rack so that juices from the food drip into the drip pan without danger of juices from the food falling in undesired locations, said shelf-like member being the sole means for retaining food in position on the rack permitting ready application to and removal of food from the rack, and heating means supported in the housing and positioned in spaced relation to the opposite surfaces of the rack to simultaneously broil both surfaces of food supported on the rack.

14. The invention according to claim 13 in which means are provided to control the effective temperature of the heating elements.

15. A broiler for simultaneously broiling food on both surfaces comprising a housing having an opening in a wall thereof for the insertion and removal of food to be broiled, a drip pan mounted in said housing and movable from a position within the housing to a position outwardly thereof, a food supporting rack mounted on said drip pan to be movable therewith, said food supporting rack comprising a plurality of bars extending from adjacent the upper end of the rack to a position closely adjacent the drip pans, means to retain the food on the rack in accurate position for broiling, means to mount the drip pan and the rack for simultaneous movement into and out of the housing to provide for placing food and removing food from the rack so that juices from the food drip into the drip pan without danger of juices from the food falling in undesired locations, said means to retain the food in position on the rack permitting ready application and removal of food, and heating means supported in the housing and positioned in spaced relation to the opposite surfaces of the rack to simultaneously broil both surfaces of the food supported on the rack.

16. A broiler comprising a base, a pair of generally planar heating elements mounted on said base in generally side by side substantially parallel relation with the plane of the heating elements being at an acute upstanding angle to the horizontal, a rack formed of a plurality of upstanding bars for reception within the space between said heating elements, means on said rack for retaining an article of food to be broiled against downward sliding movement, guide means for said rack for limiting the movement of said rack in a substantially horizontal direction substantially parallel to the planes of the heating elements, and means for collecting drippings beneath said rack, and said rack and heating elements being arranged at an angle whereby the juices will be carried along the food and along the rack to the drip collecting pan.

17. A broiler for simultaneously broiling both surfaces of an article of food comprising a housing having a base for supporting said broiler in operative position of use, a pair of heating elements mounted in said housing in spaced generally parallel relation inclined to the horizontal when the housing is supported by said base in operative position of use, the spacing of the heating elements providing a food receiving cooking space, a food supporting rack having an inclined food supporting portion adapted to be received in said food receiving and cooking space for supporting an article of food thereon by gravity so the juices exuding from the food will follow the inclination of said food downwardly, means to retain the article of food against sliding downwardly on said rack, said rack being mounted on said housing for relative movement with respect to said heating elements so the food supporting portion of the rack with the food thereon may be inserted into and removed from the space between said heating elements, means to adjust the relative spacing of the heating elements to the food supporting rack, said means to adjust the relative spacing of the heating elements including slideways in said housing and cooperating means on the heating elements slideably mounted in the slideways to provide for the movement of the heating elements relative to the food supporting rack, and handle means near one side of the housing to move said heating elements and to maintain the heating elements in adjusted positions.

18. A broiler for simultaneously broiling both surfaces of an article of food comprising a housing having a base for supporting said broiler in operative position of use, a pair of heating elements movably mounted in said housing in spaced generally parallel relation inclined to the horizontal when the housing is supported by said base in operative position of use, the spacing of the heating elements providing a food receiving cooking space, a food supporting rack having an inclined food supporting portion adapted to be received in said food receiving and cooking space for supporting an article of food thereon by gravity so the juices exuding from the food will follow the inclination of said food downwardly, means to retain the article of food against sliding downwardly on said rack, and a conveyor movably mounted on said housing into the space between the heating elements in the direction of inclination to the horizontal, said rack being mounted on said conveyor and movable from a horizontal position above the heating elements to a cooking position between the heating elements.

References Cited in the file of this patent
UNITED STATES PATENTS

| | | |
|---|---|---|
| 1,113,473 | Noreck | Oct. 13, 1914 |
| 1,329,421 | McCormick | Feb. 3, 1920 |
| 1,440,786 | Lyons | Jan. 2, 1923 |
| 1,713,303 | Serrell | May 14, 1929 |
| 1,773,109 | McCaig | Aug. 19, 1930 |
| 1,865,354 | Brunner | June 28, 1932 |
| 2,537,378 | Staltare | Jan. 9, 1956 |
| 2,848,592 | Mergen | Aug. 19, 1958 |
| 2,900,482 | Aylor | Aug. 18, 1959 |

FOREIGN PATENTS

| | | |
|---|---|---|
| 391 | Great Britain | Jan. 9, 1886 |
| 448 | Great Britain | Jan. 7, 1909 |
| 107,810 | Australia | June 20, 1937 |